(12) United States Patent
Westerlund et al.

(10) Patent No.: US 10,868,802 B2
(45) Date of Patent: Dec. 15, 2020

(54) ENABLING SETTING UP A SECURE PEER-TO-PEER CONNECTION

(71) Applicant: Telefonaktiebolaget LM Ericsson (publ), Stockholm (SE)

(72) Inventors: Magnus Westerlund, Upplands Väsby (SE); Göran Eriksson, Norrtälje (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 248 days.

(21) Appl. No.: 15/743,807

(22) PCT Filed: Jun. 22, 2016

(86) PCT No.: PCT/SE2016/050605
§ 371 (c)(1),
(2) Date: Jan. 11, 2018

(87) PCT Pub. No.: WO2017/010925
PCT Pub. Date: Jan. 19, 2017

(65) Prior Publication Data
US 2018/0205720 A1    Jul. 19, 2018

Related U.S. Application Data

(60) Provisional application No. 62/192,716, filed on Jul. 15, 2015.

(51) Int. Cl.
*H04L 29/06* (2006.01)
*H04L 29/08* (2006.01)

(52) U.S. Cl.
CPC ...... *H04L 63/0823* (2013.01); *H04L 63/0876* (2013.01); *H04L 63/126* (2013.01); *H04L 63/1466* (2013.01); *H04L 63/166* (2013.01); *H04L 65/1069* (2013.01); *H04L 65/608* (2013.01); *H04L 67/02* (2013.01); *H04L 67/104* (2013.01); *H04L 63/168* (2013.01); *H04L 65/10* (2013.01)

(58) Field of Classification Search
None
See application file for complete search history.

(56) References Cited

U.S. PATENT DOCUMENTS

| | | | |
|---|---|---|---|
| 10,193,698 B1* | 1/2019 | Das | H04L 9/3265 |
| 2004/0008666 A1* | 1/2004 | Hardjono | H04L 63/0823 370/352 |

(Continued)

OTHER PUBLICATIONS

Koskela et al., "A Secure Peer-to-Peer Web Framework", 2010 IEEE International Symposium on "A World of Wireless, Mobile and Multimedia Networks" (WoWMoM), 978-1-4244-7265-9/10, 2010.*

(Continued)

*Primary Examiner* — Piotr Poltorak
(74) *Attorney, Agent, or Firm* — Coats & Bennett, PLLC

(57) ABSTRACT

It is presented a method for a server for enabling setting up a secure peer-to-peer connection between a first peer and a second peer. The method comprises the steps of: receiving a request for a web application from the first peer; sending a directive to the first peer requesting a fingerprint of a certificate of the first peer; receiving a first fingerprint from the first peer; and sending the first fingerprint to the second peer.

16 Claims, 6 Drawing Sheets

(56) References Cited

U.S. PATENT DOCUMENTS

| | | | |
|---|---|---|---|
| 2004/0054885 A1* | 3/2004 | Bartram | H04L 63/0823 713/152 |
| 2004/0243665 A1* | 12/2004 | Markki | H04L 29/06 709/201 |
| 2006/0253703 A1* | 11/2006 | Eronen | H04L 63/061 713/156 |
| 2007/0121596 A1* | 5/2007 | Kurapati | H04L 29/06027 370/356 |
| 2009/0006844 A1* | 1/2009 | Wing | H04L 63/126 713/156 |
| 2009/0288138 A1 | 11/2009 | Kalofonos | |
| 2011/0138462 A1* | 6/2011 | Kim | H04L 63/0236 726/22 |
| 2011/0225426 A1* | 9/2011 | Agarwal | G06F 21/41 713/175 |
| 2011/0289319 A1* | 11/2011 | Elwell | H04L 63/123 713/176 |
| 2011/0316965 A1* | 12/2011 | Moore | H04L 12/1827 348/14.09 |
| 2014/0201820 A1 | 7/2014 | Li et al. | |
| 2015/0026473 A1* | 1/2015 | Johnston | H04L 63/126 713/171 |
| 2015/0121455 A1* | 4/2015 | Siegel | H04L 63/12 726/2 |
| 2015/0341312 A1* | 11/2015 | Ezell | H04L 63/029 726/11 |
| 2015/0350198 A1* | 12/2015 | Li | H04L 63/0823 713/156 |
| 2016/0182504 A1* | 6/2016 | Li | H04L 67/141 726/5 |
| 2016/0269315 A1* | 9/2016 | Eriksson | H04L 41/0896 |
| 2017/0012776 A1* | 1/2017 | Pal | H04L 65/1006 |
| 2017/0237742 A1* | 8/2017 | Salmela | H04W 4/70 726/4 |
| 2017/0250827 A1* | 8/2017 | Opschroef | H04L 63/0823 |
| 2017/0257215 A1* | 9/2017 | Huang | H04L 67/1097 |
| 2017/0331793 A1* | 11/2017 | Beltran | H04L 63/0414 |
| 2019/0379735 A1* | 12/2019 | Huang | H04L 9/0841 |

OTHER PUBLICATIONS

Linlin et al., "The Implementation of an Secure RTP Transmission Method Based on DTLS", 2013 Third International Conference on Instrumentation, Measurement, Computer, Communication and Control, IEEE 978-0-7695-5122-7/13, 2013.*

Westerlund et al., RFC7201, 2014.*

Tressel et al., "A System for Secure IP Telephone Conferences", Fifth IEEE International Symposium on Network Computing and Applications, IEEE 0-7695-2640-3/06, 2006.*

Fischl et al., RFC5763, 2010.*

Anonymous, "Session Initiation Protocol—Wikipedia," Jul. 3, 2015; pp. 1-9; retrieved from the Internet: https://en.wikipedia.org/w/index.php?title=Session_Initiation_Protocol&oldid=669782339.

Rescorla, E., "WebRTC Security Architecture draft-ietf-rtcweb-security-arch-11," Real-Time Communications on the Wbe (RTCWEB) working group, Internet-Draft, Standards Track, Mar. 7, 2015, pp. 1-41.

Alvestrand, H., "Overview: Real Time Protocols for Browser-based Applications draft-ietf-rtcweb-overview-14," Network Working Group, Internet-Draft, Standards Track, Jun. 16, 2015, pp. 1-22.

Sterne, B., editor, et al., "Content Security Policy 1.0 W3C Working Group Note Feb. 19, 2015," Web Application Security Working Group, Feb. 19, 2015, http://www.w3.org/TR/2015/NOTE-CSP1-20150219/, pp. 1-2.

Bergkvist, A., editor, et al., "WebRTC 1.0: Real-time Communication Between Browsers," W3C Working Draft Feb. 10, 2015, Web Application Security Working Group, Feb. 10, 2015, http://www.w3.org/TR/2015/WD-webrtc-20150210/, pp. 1-45.

Anonymous, Session Initiation Protocol—Wikipedia, Jul. 3, 2015, XP055377344, URL:https://en.wikipedia.org/w/indexphp?title=Sessions_Initiation_Protocol&oldid=669782339.

* cited by examiner

US 10,868,802 B2

ENABLING SETTING UP A SECURE PEER-TO-PEER CONNECTION

TECHNICAL FIELD

The invention relates to methods, servers, peer devices, computer programs and computer program products for enabling setting up a secure peer-to-peer connection.

BACKGROUND

WebRTC (Web Real Time Communication) RTCPeer-Connections, are peer to peer associations that are capable of bi-directional transport of real-time media such as audio and video, as well as transfer of data objects. These RTCPeer-Connections are established through the exchange of certain configuration information. In Web browsers there is a defined JavaScript API (Application Programming Interface) to trigger RTCPeerConnection establishment and which consumes and provides the necessary configuration information. This configuration information is then exchanged through a find and connect service, often built on centralized servers, e.g. using HTTP (HyperText Transfer Protocol), WebSockets etc. for transport of the necessary signaling information between the peers via the server.

Java Script (JS) is code that is executed in the web browser sandbox, i.e. only within the web browser with no general access to the underlying operating system. However, despite various security mechanisms, there is a significant risk for code injection into the JS code that a particular user runs in the browser when accessing a particular web service. Such risks are man-in-the-middle injections, cross site scripting (XSS) or poorly done mash-ups that results in that malicious Java Script can be executed.

SUMMARY

An object with the embodiments is to prevent attacks where a man in the middle is inserted as peer for a peer to peer connection, such as an RTCPeerConnection. The attack is accomplished using manipulation of signaling messages performed by client side code that has been injected into the local browser (User Agent) context.

According to a first aspect, it is presented a method for a server for enabling setting up a secure peer-to-peer connection between a first peer and a second peer. The method comprises the steps of: receiving a request for a web application from the first peer; sending a directive to the first peer requesting a fingerprint of a certificate of the first peer; receiving a first fingerprint from the first peer; and sending the first fingerprint to the second peer.

The method may further comprise the steps of: receiving a request for the web application from the second peer; sending a directive to the second peer requesting a fingerprint of a certificate of the second peer; receiving a second fingerprint from the second peer; and sending the second fingerprint to the first peer.

The step of sending a directive to the first peer may comprise sending a directive to instruct the first peer to submit hash values for each certificate used with any peer-to-peer connections associated with the web application; in which case the step of receiving the first fingerprint data comprises receiving a respective hash value of each certificate in use in the context for the web application.

When performed, the step of sending a directive to the second peer may comprise sending a directive to instruct the second peer to submit hash values for each certificate used with any peer-to-peer connections associated with the web application; in which case, when performed, the step of receiving the second fingerprint data comprises receiving a respective hash value of each certificate in use in the context for the web application.

The phrase 'when performed' is to be construed as when the (optional) step is question is performed, there is additional subject-matter which is applicable.

The step of sending a directive to the first peer may comprise sending a content security policy, CSP, directive; in which case the step of receiving the first fingerprint data comprises receiving a CSP directive comprising a respective fingerprint of each certificate in use in the context for the web application.

When performed, the step of sending a directive to the second peer may comprises sending a CSP directive; in which case, when performed, the step of receiving the second fingerprint data comprises receiving a CSP directive comprising a respective fingerprint of each certificate in use in the context for the web application.

The method may further comprise the step of: receiving configuration information from the first peer, the configuration information including an identifier of the second peer.

The method may further comprise the step of: checking a validity of the sender of the configuration message by checking the configuration message against the first fingerprint data.

The method may further comprise the steps of: sending two uniform resource identifier, URIs, respectively for the first peer and the second peer, to receive fingerprint data. In such a case, the step of sending the first fingerprint to the second peer comprises sending the first fingerprint in a response to a request using one of the URIs; and the step of sending the second fingerprint to the first peer comprises sending the second fingerprint in a response to a request using one of the URIs.

The secure peer to peer connection may be a Datagram Transport Layer Security, DTLS, connection and each certificate is then a DTLS certificate.

According to a second aspect, it is presented a server for enabling setting up a secure peer-to-peer connection between a first peer and a second peer. The server comprises: a processor; and a memory comprising instructions executable by the processor to: receive a request for a web application from the first peer; send a directive to the first peer requesting a fingerprint of a certificate of the first peer; receive a first fingerprint from the first peer; and send the first fingerprint to the second peer.

The server may further comprise instructions executable by the processor to: receive a request for the web application from the second peer; send a directive to the second peer requesting a fingerprint of a certificate of the second peer; and receive a second fingerprint from the second peer; and send the second fingerprint to the first peer.

The instructions to send a directive to the first peer may comprise instructions executable by the processor to send a directive to instruct the first peer to submit hash values for each certificate used with any peer-to-peer connections associated with the web application; in which case the instructions to receive the first fingerprint data comprise instructions executable by the processor to receive a respective hash value of each certificate in use in the context for the web application When performed, the instructions to send a directive to the second peer may comprise instructions executable by the processor to send a directive to instruct the second peer to submit hash values for each certificate used with any peerto-peer connections associated with the web application; in which case, when performed, the instructions to receive the second fingerprint data comprise instructions executable by the processor to receive a respective hash value of each certificate in use in the context for the web application.

The instructions to send a directive to the first peer may comprise instructions executable by the processor to send a content security policy, CSP, directive; in which case the instructions to receive the first fingerprint data comprise instructions executable by the processor to receive a CSP directive comprising a respective fingerprint of each certificate in use in the context for the web application.

When performed, the instructions to send a directive to the second peer may comprise instructions executable by the processor to send a CSP directive; in which case, when performed, the instructions to receive the second fingerprint data comprise instructions executable by the processor to receive a CSP directive comprising a respective fingerprint of each certificate in use in the context for the web application.

The server may further comprise instructions executable by the processor to receive configuration information from the first peer, the configuration information including an identifier of the second peer.

The server may further comprise instructions executable by the processor to check a validity of the sender of the configuration message by checking the configuration message against the first fingerprint data.

The server may further comprise instructions executable by the processor to: send two uniform resource identifier, URIs, respectively for the first peer and the second peer, to receive fingerprint data. In such a case, the instructions to send the first fingerprint to the second peer comprise instructions executable by the processor to send the first fingerprint in a response to a request using one of the URIs; and the instructions to send the second fingerprint to the first peer comprise instructions executable by the processor to send the second fingerprint in a response to a request using one of the URIs.

The secure peer to peer connection may be a Datagram Transport Layer Security, DTLS, connection and each certificate may be a DTLS certificate.

According to a third aspect, it is presented a server comprising: means for receiving a request for a web application from a first peer; means for sending a directive to the first peer requesting a fingerprint of a certificate of the first peer; means for receiving a first fingerprint from the first peer; and means for sending the first fingerprint to a second peer to thereby enable setting up a secure peer-to-peer connection between the first peer and the second peer.

According to a fourth aspect, it is presented a computer program for enabling setting up a secure peer-to-peer connection between a first peer and a second peer. The computer program comprises computer program code which, when run on a server causes the server to: receive a request for a web application from the first peer; send a directive to the first peer requesting a fingerprint of a certificate of the first peer; receive a first fingerprint from the first peer; and send the first fingerprint to the second peer.

According to a fifth aspect, it is presented a computer program product comprising a computer program according to the fourth aspect and a computer readable means on which the computer program is stored.

According to a sixth aspect, it is presented a method of a first peer for enabling setting up a secure peer-to-peer connection between a first peer and a second peer. The method comprises the steps of: sending a request for a web application to a server; receiving a directive for a fingerprint of a certificate of the peer; and sending, in response to the request, a first fingerprint of a certificate of the first peer for verification that the first fingerprint corresponds to a certificate of the first peer.

The step of receiving the directive for the fingerprint may comprise receiving a CSP directive for the fingerprint; and the step of sending the fingerprint comprises sending the fingerprint in a CSP directive.

The method may further comprise the steps of: receiving a second fingerprint of a certificate of the second peer; and verifying, in a handshake process with the second peer, an identity of the second peer by comparing with the second fingerprint, wherein the handshake is only successful when the verification is successful.

The step of receiving the second fingerprint may comprise receiving the second fingerprint in a CSP directive.

The method may further comprise the step of: receiving a URI for receiving fingerprint data; sending a fingerprint data request using the URI; and wherein the step of receiving the second fingerprint comprises receiving a response to the fingerprint data request, the response comprising the second fingerprint.

Each fingerprint may comprise a hash value of a certificate.

The step of sending the first fingerprint may comprise sending the first fingerprint using a URI included in the directive for the fingerprint.

The secure peer to peer connection may be a Datagram Transport Layer Security, DTLS, connection and each certificate may be a DTLS certificate.

According to a seventh aspect, it is presented a peer device being a first peer for enabling setting up a secure peer-to-peer connection between the first peer and a second peer. The peer device comprises: a processor; and a memory comprising instructions executable by the processor to: send a request for a web application to a server; receive a directive for a fingerprint of a certificate of the peer; and send, in response to the request, a first fingerprint of a certificate of the first peer for verification that the first fingerprint corresponds to a certificate of the first peer.

The instructions to receive the directive for the fingerprint may comprise instructions executable by the processor to receive a CSP directive for the fingerprint; in which case the instructions to send the fingerprint comprise instructions executable by the processor to send the fingerprint in a CSP directive.

The peer device may further comprise instructions executable by the processor to: receive a second fingerprint of a certificate of the second peer; verify, in a handshake process with the second peer, an identity of the second peer by comparing with the second fingerprint, wherein the handshake is only successful when the verification is successful.

The instructions to receive the second fingerprint may comprise instructions executable by the processor to receive the second fingerprint in a CSP directive.

The peer device may further comprise instructions executable by the processor to: receive a URI for receiving fingerprint data; send a fingerprint data request using the URI. In such a case, the instructions to receive the second fingerprint comprise instructions executable by the processor to receive a response to the fingerprint data request, the response comprising the second fingerprint.

Each fingerprint may comprise a hash value of a certificate.

The instructions to send the first fingerprint may comprise instructions executable by the processor to send the first fingerprint using a URI included in the directive for the fingerprint.

The secure peer to peer connection may be a Datagram Transport Layer Security, DTLS, connection and each certificate may be a DTLS certificate.

According to an eighth aspect, it is presented a peer device comprising: means for sending a request for a web application to a server; means for receiving a directive for a fingerprint of a certificate of the peer; and means for sending, in response to the request, a first fingerprint of a certificate of the peer device, being a first peer, for verification that the first fingerprint corresponds to a certificate of the first peer, to thereby enable setting up a secure peer-to-peer connection between the first peer and a second peer.

According to a ninth aspect, it is presented a computer program for enabling setting up a secure peer-to-peer connection between a first peer and a second peer. The computer program comprises computer program code which, when run on a peer device being the first peer causes the peer device to: send a request for a web application to a server; receive a directive for a fingerprint of a certificate of the peer; and send, in response to the request, a first fingerprint of a certificate of the first peer for verification that the first fingerprint corresponds to a certificate of the first peer.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
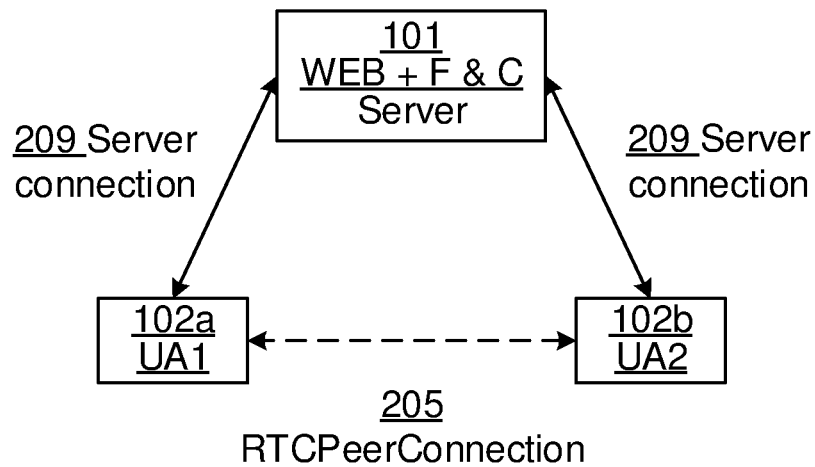
FIG. 1 is schematic diagram illustrating an environment in which embodiments presented herein can be applied, where the web server and the find and connect server are implemented in the same server.

FIG. 1 is schematic diagram illustrating an environment in which embodiments presented herein can be applied, where the web server and the find and connect server are implemented in the same server.

There is here a first peer 102a and a second peer 102b. The first peer 102a can correspond to a first user agent (UA), UA1, and the second peer 102b can correspond to a second UA, UA2 or could alternatively be a server.

A combined server 101 implements a web server and a find and connect (F & C) server. The F&C server is used for exchange of configuration information for a connection 205 between the UA1 102a and UA2 102b. The F&C server can be built on centralized servers, e.g. using HTTP, WebSockets etc., and is thus combinable with the web server as shown here or the F&C server can be separate from the web server as shown in FIG. 2 and explained below.

Each one of the two peers 102a-b use a server connection 209 to connect with the combined server 101 to thereby establish a connection 205, such as a RTCPeerConnection, between the two peers 102a-b, as explained in more detail below, with reference to FIG. 3 and FIGS. 5A-B.

Figure 2:
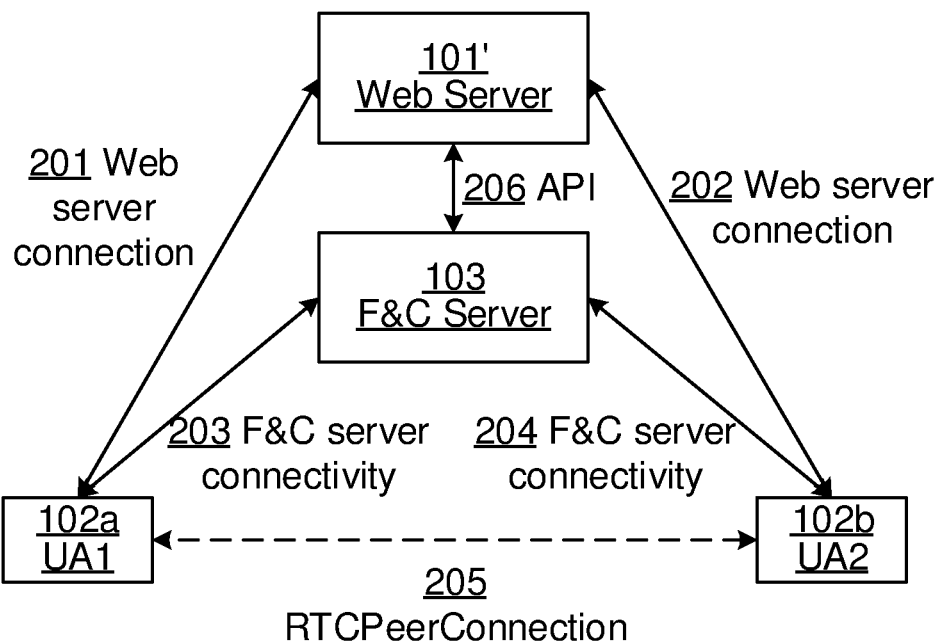
FIG. 2 is schematic diagram illustrating an environment in which embodiments presented herein can be applied, where the web server and the find and connect servers are separate entities.

FIG. 2 is schematic diagram illustrating an environment in which embodiments presented herein can be applied, where the web server and the find and connect servers are separate entities. As for FIG. 1, there are a first peer 102a and a second peer 102b.

The first peer 102a connects to the web server 101' via a web server connection 201 and connects to the F&C server 103 via a F&C server connection 203.

The second peer 102b connects to the web server 101' via a web server connection 202 and connects to the F&C server 103 via a F&C server connection 204.

There is an API (Application Programming Interface) 206 provided between the web server 101' and the F&C server 103.

As in FIG. 1, the structure is used to establish a connection 205 between the first peer 102a and the second peer 102b, as explained in more detail below, with reference to FIG. 4 and FIGS. 5A-B.

All the connections of FIGS. 1 and 2 can e.g. be implemented using Internet Protocol (IP), e.g. using HTTP over TCP (Transport Control Protocol)/IP connections.

Figure 3:
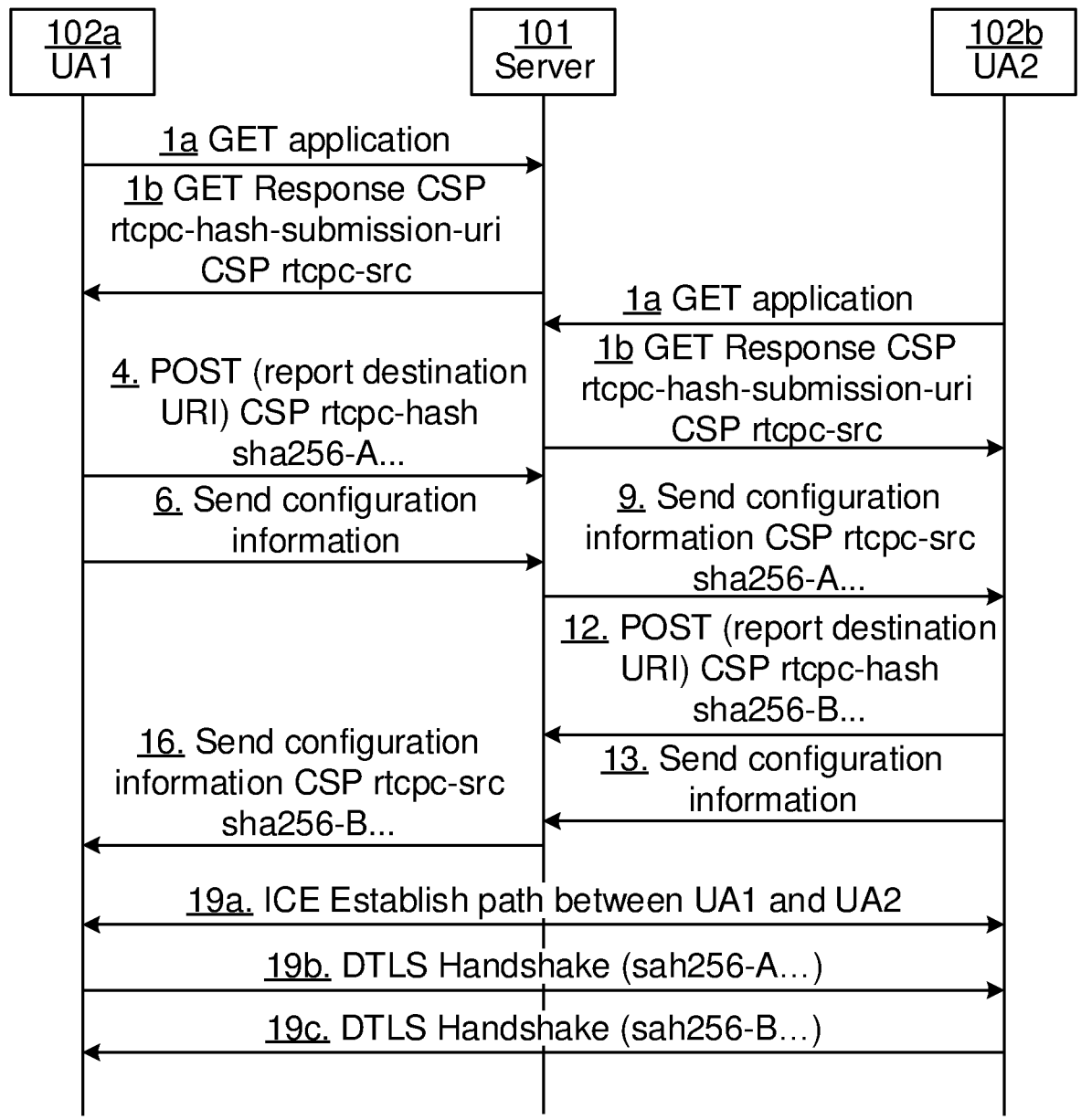
FIG. 3 is a schematic sequence diagram illustrating communication when the web server and the find and connect server are implemented in the same server.

FIG. 3 is a schematic sequence diagram illustrating communication when the web server and the find and connect server are implemented in the same server.

There are a number of technologies related to the embodiments herein, as will now be explained.

Content Security Policies (CSP) is a security in-depth solution that can help mitigate or prevent attacks that may occur when the JS executed in the browser has been manipulated. CSP works by having the web server include a "Content-Security-Policy" HTTP header or including in the HTML (Hypertext Markup Language) <meta> tag one or more content policies. A content policy consists of a directive and value. For example, "default-src 'self'" restricts any content included under the resource to only come from the same origin. As the browser fetches and first process any content prior to executing any active parts of the content, the browser can both ingest the policies and check if the content fulfils the polices before executing it. In case a policy is violated, the web server may request that the browser reports violation to a particular URI (Uniform Resource Identifier) or block the action in question or both.

A typical usage of CSP is to initially have the browser only report of violations of the directive and thereafter, possibly considering other factors, instruct the browser to block the action.

The DNS (Domain Name Server)-Based Authentication of Named Entities (DANE) is a technology to guard against misuse of certificates, meaning a Certificate Authority (CA) issues a certificate to an entity that does not represent the domain owner in the certificate. The domain operator has knowledge about which CA he used and conveys this information securely to the clients using DNSSEC (DNS Security Extensions). DANE can also be used instead of relying on CA establishing a trust chain. This is done by including the certificate's public key or it's hash fingerprint in the DANE DNS record. A DANE capable client will verify when establishing TLS (Transport Layer Security) that the certificate presented by the server contains a matching key, have the correct hash, or have conforming properties, such as issuing CA.

The server for a WebRTC using web application has limited means in the prior art to protect the user from certain serious attacks due to code injection into the application run in the user agent. The most serious risk is that the malicious code injects a man in the middle on the data and media path during the RTCPeerConnection establishment. This is done by replacing the DTLS (Datagram TLS) fingerprint as well as address information in the configuration information. This results in that the peer, as well as local User Agent, connects to the man in the middle and accepts it in the WebRTC DTLS/SRTP keying during the RTCPeerConnection establishment. This enables the attacker to receive all communication between the peers, i.e. wiretapping the user.

One protection against this attack is the use of client side signing of the signaling using an Identity Provider (IdP). However, this protection is optional and invoked by the JS unless the user has configured an IdP themselves, thus enabling the malicious script to skip this. Commonly, disabling the assertion of an Identity is unlikely to be noticed by the user in most applications. In addition, the actual signing requires the user to have an Identity with an Identity provider and provide its credentials at some stage. Thus, this security has an overhead from the user's perspective.

DANE is intended for named entities, however with the possible exception to media servers, WebRTC endpoints e.g. web browsers, commonly don't have names that are possible to look up in the public DNS system. In fact, due to the privacy concerns, a WebRTC browser does not want to use the same certificate at multiple different web services (origins) due to the possibility of tracking the user and endpoint across multiple services.

As DANE also uses the DNS system, a distributed system with significant amount of caching, there can be significant impact on performance. If the DNS records are not already cached in the local resolver, the number of cache access occurrences (i.e. round trip times) until the record is delivered may be significant as the resolver will have to walk the record chain from the root until it reaches the authoritative name server for the domain name. Also, if the information would need to be updated there will commonly be significant delay until the old cached records have expired and the new one has been retrieved.

Looking now to the embodiment illustrated by FIG. 3, a web application uses RTCPeerConnections for communication, be that real-time media or data object transport, between instances of the web application in different user's User Agents (UA). We will use the basic single server use case from WebRTC where both UAs 102*a-b* use one server (the origin of the web application used in both UAs) for the necessary signaling. However, the solution is applicable to various deployments, not only the one depicted in FIG. 1. Whenever the term origin is used herein, it is the server providing the web application to the user agent in the embodiments herein.

The steps for establishing one RTCPeerConnection with the security protection of the method is the following, with focus on the steps relevant to the method for the security mechanism. The messages exchanges between the entities in the below sequence are shown in a sequence diagram in FIG. 3. It is to be noted that while the term UA is used for the two peers here, each of these can be substituted with another type of peer, such as a server.

1. When the UA sends a GET request 1*a* for any resource related to the web application served by the origin server 101' that uses the security protection of the method, the server 101' includes a new CSP directive in its HTTP response 1*b*. This new CSP directive, here named "rtcpc-hash-submission-uri" includes a value that is an HTTP(s) URI (the report destination URI). The directive instructs the UA to submit the certificate hash values (fingerprints) for all DTLS certificates used with any RTCPeerConnection created in the context (and sub-contexts) of the application to the URI included as value in the directive. The web application can be implemented such that the CSP directive for reporting is set for the UA context after the user has authenticated herself/himself to the application. This enables the report destination URI to encode the user id and session. When the UA requests the resources of the application, the server also includes a CSP directive we name "rtcpc-src" without any value. This directive's value is a list of hashes of DTLS certificates (fingerprints). Setting the directive with an empty value, will block any attempts to establish an RTCPeerConnection. This as the directive explicitly lists the peers whose fingerprints that are allowed to establish RTCPeerConnections with, thus an empty list allow no RTCPeerConnections. Both UA1 102*a* and UA2 102*b* have done this before proceeding to the next step.

2. The user of UA1 102*a* then initiates some activity in the web application, such as clicking a call button in the user interface, which requires that an RTCPeerConnection is established with UA2 102*b*.

3. The JS code running in UA1 102*a* for the web application creates an RTCPeerConnection object. This results in several UA1 101*a* local actions; one is the creation or usage of a locally stored certificate that will be used to secure the DTLS-SRTP keying part of the RTCPeerConnection establishment. This certificate is bound to the RTCPeerConnection object.

4. The UA1 102*a* follows the CSP directive ("rtcpc-hash-submission-uri") and sends an HTTP(s) request 4 using the report destination URI (the value of the directive) as resource identifier to report hashes for all the certificates currently in use by RTCPeerConnections in this context. The certificate hashes can be part of a CSP request directive, such as "rtcpc-hash sha256-b4a0ac31d59a0c9f794e04be232e1143bca0a50a21ed3-85492e2e7e50fa88f00".

Example of an HTTP POST message used here:
POST  /Hash-Submission/NTA2MDUzNTk2NTk4-MzIxMDY4MTI4NzQyNTM1Mj
M=HTTP/1.1
Host: www.example.com
Content-Security-Policy: rtcpc-hash sha256-b4a0ac31-d59a0c9f794e04be232e1143bca0a50a21ed385492e-2e7e50fa88f00
Content-Length: 0

The value of the directive is a list of hash values, prefixed by the hashing algorithm (e.g. SHA (Secure Hash Algorithm)-256 or SHA-512) used to create the hash. The certificate hashes could alternatively be part of the request body in a suitable defined format. The server specified by the report destination URI stores the hashes associated with the user id and session (part of the request URI) in suitable data structure or database on the server.

5. The JS code further then calls the RTCPeerConnection API method CreateOffer that generates the necessary configuration information that the peer UA needs to be able to establish the RTCPeerConnection.

6. The configuration information is then requested to be sent using appropriate transport from the UA to the Find and Connect (F&C) server functionality, in this case part of the web server (origin), including an identifier for the peer this configuration information is intended to. Appropriate transport can be for example HTTPS, secure WebSocket, but not limited to these.

7. When the F&C server (part of the combined server 101) receives the configuration information, any presence of the a=identity SDP attribute or corresponding (e.g. a=fingerprint, that contains only the certificate hash(es) and are part of the signalling/configuration information), the value of that header can be validated by checking against the certificate hash value received in the earlier step directly from the UA for this user id and session. If the hash values don't match, the F&C server has detected an issue and a possible attempt to insert a man in the middle on the RTCPeerConnection media path. The F&C server may also perform other analysis of the fingerprint and user identity to decide whether to consider the end-point (user and/or user agent) malicious or not. One such as example is an end-point whose calling patterns indicate it being malicious. If the certificate hashes match and no other issue have been detected the processing continues.

8. The F&C server determines how to transport the configuration information to the intended recipient's JS application instance in UA2 102*b*.

9. Using the determined transport connection, the configuration data 9 is scheduled for transmission to UA2 102*b*. When sending the information in a protocol that supports the inclusion of the CSP header, then the directive that lists the white listed certificates, e.g. "rtcpc-src sha256-b4a0ac31d59a0c9f794e04be232e11-43bca0a50a21ed385492e2e7e50fa88f00", is included to indicate UA1's DTLS certificate hash that is expected to be the peer when the DTLS handshake occurs during the RTCPeerConnection establishment between UA2 102*b* and UA1 102*a*.

10. UA2 102*b* receive the CSP header and stores the directive and hash value associated with the relevant context. The configuration information is provided to the JS code running in UA2 102*b* for the web application.

11. The JS code processes the configuration and creates an RTCPeerConnection (if not already done) and the adds the remote configuration information from UA1 102*a* to the peer connection. Then it retrieves the local configuration information that needs to be provided to UA1 102*a* to enable it to complete the RTCPeerConnection establishment. This information is then sent back to the F&C server (part of the combined server 101). This will start attempt of UA2 102*b* to establish an RTCPeerConnection with UA1 102*a*.

12. The creation of the RTCPeerConnection in UA2 102*b* will trigger its reporting of the DTLS certificate hash values used in UA2's RTCPeerConnection. Thus, UA2 102*b* sends an HTTP(s) request 12 using the report destination URI provided in the CSP "rtcpc-hash-submission-uri" directive to the combined server 101. This request includes the hash value of the certificate. Similar to before the request could for example be using a CSP directive such as "rtcpc-hash sha256-782045-6dd950d9e41f75a2dd682723c1ea325f37301da96860-b71177ec26dc83".

13. UA2 sends back the configuration information 13 to the F&C server, part of the combined server 101.

14. When the report destination server receives UA2's certificate hashes for the resource indicated by the reporting URI, the server 101 will store UA2's certificate hashes associated with the user id and session id.

15. When the F&C server 101 has received both the configuration information from UA2 (step 13) as well as the certificate hash report (step 14), it can go on to do the comparison of the hash value in the a=identity attribute part of the configuration information (or corresponding, such as a=fingerprint) with the value reported by UA2 using the CSP report directive. If they are matching, then the process continues. Again, the F&C server 101 may further analyze the information to decide on whitelisting or not of end-points.

16. Then the F&C server 101 forwards the configuration information 16 to UA1. In that message, it will include the CSP header "rtcpc-src sha256-7820456dd9-50d9e41f75a2dd682723c1ea325f37301da96860b711-77ec26dc83". Thus providing UA1 with the known certificate(s) that are acceptable as peer when establishing the RTCPeerConnection, i.e. the hash of UA2's certificate.

17. When UA1 102*a* receives the message, it stores the CSP directive and value.

18. Then JS code of UA1 102*a* executes on the received configuration information, adding it as remote description. This will trigger UA1's RTCPeerConnection establishment procedure.

19. If Interactive Connectivity Establishment (ICE) 19*a*, e.g. as described in RFC5245, is successful in establishing a direct path between UA1 102*a* and UA2 102*b*, then the DTLS handshake 19b-c is performed. When that DTLS handshake is performed, the certificate used by each peer is normally exchanged. Upon receiving the certificate each of the UAs verify that the peer's certificate has a matching hash value to a value given in the "rtcpc-src" directive. If not, the connection establishment is aborted. If a CSP failure report directive was included that is followed.

Hence, a man in the middle attack is prevented by providing the origin server (the combined server 101) with the hash fingerprints of the DTLS certificate used in the RTCPeerConnection by the UAs 102a-b, e.g. in a CSP policy report to the server. As the submission of the certificate fingerprint is performed by the User Agent (UA), a corrupt JS can't interfere with the submission.

The origin server (i.e. the combined server 101 here) collects the valid fingerprint for that UA and keeps it associated with the signaling user identity. The server 101 uses the fingerprint and user identity to prevent the application to inject the man in the middle's addresses and DTLS certificate fingerprint instead of the true ones for the peers' who are under attack. The server 101 may also detect malicious end-points, by verifying fingerprints in signaling information, and for instance by analyzing calling patterns of users, deciding on whether user(s) should be whitelisted or not.

Referring to the procedure described above in FIG. 3 in steps 4, 6, 12 and 13, the server 101 receives information from the user agents (UA) such as fingerprint and peer connection configuration information used to establish the peer connection. The arrival of this data to the server 101, for instance as events, is used by the server 101 to analyze if a communication is suitable. If not, the server may mark a user agent with a specific fingerprint as not white listed, which will cause the user agent receiving the information in step 9 or 16 to fail establishing the peer connection(s) if attempted. The server 101 may also, after a peer connection has been established, monitor the communication session itself including participants behavior or based on other, external input, decide that the communication session should be terminated or a participant be dropped, in which case the relevant peer connection needs to be terminated. This termination can be accomplished by removing the peer user agent's fingerprint from the list of approved hashes in the CSP directive "rtcpc-src" sent to the affected user agent, for instance using an HTTP POST message. When a UA receives the directive, it needs to check for each RTCPeerConnection that the peer hash is still on the list, if not it terminates the RTCPeerConnection.

In some embodiments, the server 101 may decide on whether a user agent can be used for a particular communication service using a list of user agent's identified by DTLS fingerprints. The user associated with a particular UA instance and thus particular DTLS certificate hashes is also useful information when the server 101 determines if a particular communication session is to be allowed to be established. As described in bullet 1 above, the application can ensure that the user and its login session is bound to the URI used when reporting the certificate hashes. In applications where a particular user is restricted to communicate with only a subset, like a friends list, or other closed user group, the server can check that the user initiating a communication session is allowed to communicate with identified user and its endpoint. This will prevent the malicious application executing on the UA(s) from having UA1 communicate with UA3 (controlled by attacker) and at the same time establish a second RTCPeerConnection from UA3 to UA2, thus creating a connection between UA1 and UA2 with UA3 as man in the middle.

In some embodiments, the RTCPeerConnection configuration information may be protected end-to-end by the UAs 102a-b, meaning the F&C server cannot retrieve the DTLS fingerprint from it, in which case the necessary information for the server 101 is sent out-of-band of the RTCPeerConnection information exchange between UAs 102a-b to the server 101.

Figure 4:
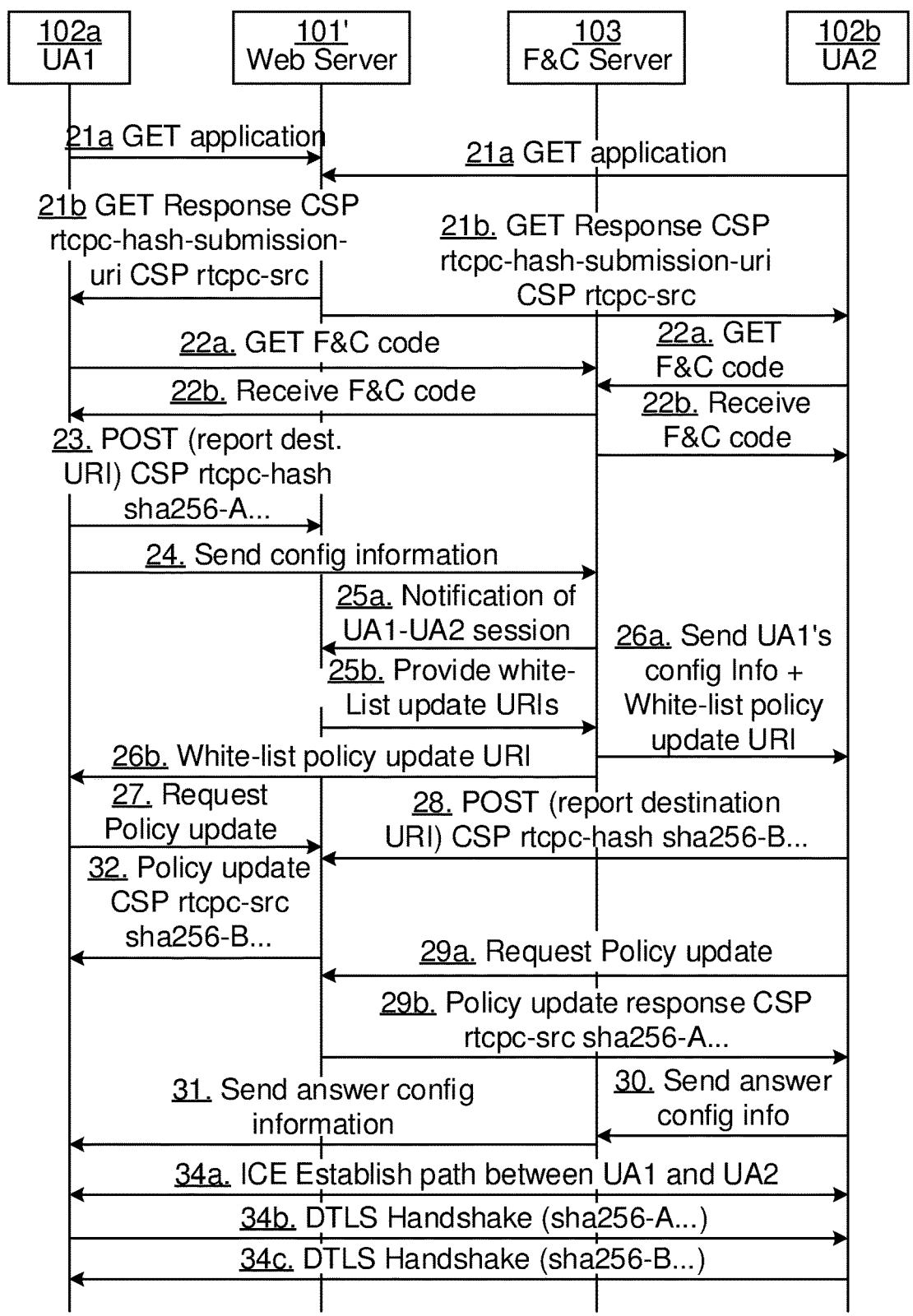
FIG. 4 is a schematic sequence diagram illustrating communication when the web server and the find and connect server are separate entities.

FIG. 4 is a schematic sequence diagram illustrating communication when the web server and the find and connect server are separate entities.

In some deployments one chooses to separate the web server 101' and the find and connect server 103 used for establishing the RTCPeerConnections into different servers. Reasons for this include separation of concerns or outsourcing of operations and management of the real-time media communication or conferencing part of a web application. The described security solution is still possible to use, but as seen in FIG. 2, there are more entities involved and more communication links. Depending on the trust relations between the web server 101' and the F&C server 103, there can be different implementations.

We will describe an example implementation where the web server 101' will control the user authorization as well as establishing the use of the security solution. The F&C server 103 uses an API (206 in FIG. 2) between the F&C server 103 and the web server 101' to verify any identity assertions as well some other functions explicitly described below. Otherwise the F&C server 103 handles routing of any signaling message for establishing RTCPeerConnections. The messages exchanged between the entities for the below sequence is shown in a sequence diagram in FIG. 4.

21. The user agent issues get requests 21a for resources of the web application from the origin server 101' (web server 101' in FIG. 2). This web application uses WebRTC components for certain part of its functionality. One or more of the response 21b from the server 101' includes the CSP policy requiring reporting of the DTLS certificate hash (fingerprint) being used ("rtcpc-hash-submission-uri") as well as an "rtcpc-src" directive with an empty value. The later directive "rtcpc-src" is to prevent any RTCPeerConnection to be established prior to any peer being explicitly allowed (white-listed) by the server. The origin server can also use the CSP to limit what scripts that can be loaded into the contexts and from where, thus limiting it to itself and the domain used for the F&C server 103. Both UA1 102a and UA2 102b complete this.

22. The page/script delivered by the origin server 101' loads the JS source and other resources from the Find and Connect (F&C) Server 103. The CSP directives are inherited from the origin server as this is included into the same security context. At this time the F&C server 103 also verifies the identity of the user in a suitable manner, for example using its API with the web server 101' (206. In FIG. 2).

23. The user's interaction with the application, for example clicking a call button in the user interface, results in that UA1 102a initiate the creation of an RTCPeerConnection to meet the communication need with UA2 102b. As the RTCPeerConnection is created, the hash used by UA1 102a for this RTCPeerConnection is reported using an HTTP request targeted at the reporting URI provided by the CSP "rtcpc-hash-submission-uri" directive. In this case the web server 101', as its want to control the approval of which peers are allowed to establish RTCPeerConnections.

24. The web application in UA1 102*a* sends the configuration information 24 from the RTCPeerConnection it has created to the F&C server 103 together with the identity of the destination peer.
25. The F&C server 103 uses the API to inform 25*a* the web server 101' that UA1 102*a*, is attempting to establish connection to UA2 102*b* and they need their corresponding hashes to be white-listed. One possible way of solving the synchronization requirement that the white list needs to be in place in the UAs prior to the RTCPeerConnection DTLS handshake is the following; the web server 101' returns to the F&C two different URIs 25*b*, one for each of the two UAs. The UA needs to retrieve this resource to get the updated white-list for this resource and that needs to complete prior to finalizing the RTCPeerConnection establishment. These URIs is here called the white-list policy update URI. The URI is a reference to a web server database record that enables the server to determine which certificate fingerprint that is needed by this web application instance. The F&C server 103 can verify that the configuration information certificate fingerprint is matching the one the UA submitted to the server by using the F&C server to Web server API to either request the submitted fingerprint and perform the comparison in the F&C or submit the fingerprint from the configuration information and have the web server 101' perform the comparison.
26. The F&C server 103 sends the configuration information 26*a* to UA2 102*b*, the intended destination. In addition, UA2 102*b* is also sent its white-list policy update URI. At the same time the F&C server 103 sends to UA1 102*a* the white-list policy update URI 26*b*.
27. UA1 102*a* requests 27 the white-list policy update resource. The web server 101' looks up which certificate fingerprint that needs to be provided in the CSP "rtcpc-src" directive's value field. The web server 101' does not yet have UA2's hash, and will therefore leave UA1 102*a* hanging until the server has the hash.
28. The web application in UA2 102*b* creates an RTCPeerConnection, feeding it the configuration information received from UA1 102*a*. The creation of the RTCPeerConnection in UA2 102*b* initiates the UA's reporting of the DTLS certificate hash (fingerprint) 28 to the resource URI set by the CSP "rtcpc-hash-submission-uri" directive's value.
29. Then the application in UA2 102*b* requests 29*a* the white-list policy update resource from the web server 101', using the provided URI. The request will provide the updated CSP "rtcpc-src" directive. When the web server 101' gets the request it checks if it has the hash relevant, i.e. UA1's hash. As this was reported earlier it is likely to be in place, if not this action will be hanging until the hash has become available. In the web server's response 29*b* to the white-list policy update request a CSP "rtpc-src" directive will be included where one of the hashes part of the value is the one UA1 102*a* provided. There might be multiple hashes if the application in the context has multiple RTCPeerConnection with different peers.
30. When the white-list update resource has been received by UA2 102*b*, the script can safely continue knowing the policy is in place. Thus the application applies the configuration from UA1 102*a* to the RTCPeerConnection. Then the application generates the RTCPeerConnection's answering configuration and sends 30 that to the F&C server 103. After this the RTCPeerConnection communication path establishment continues on UA2 102*b* side until it succeeds or times out.
31. The F&C server 103 upon receiving UA2's configuration information forwards that 31 to UA1 102*a*. It can first perform the verification that the fingerprint UA2 102*b* provides in the configuration matches what it submitted to the webserver. As in step 25, this can be performed in either the F&C or the web server 101' depending on the APIs design and who one trusts to perform the comparison.
32. At some time after step 28 happens, the web server 101' will receive UA2's hash and store it. When receiving it will determine that it has an outstanding request for a policy update resource from UA1 102*a* that references the resource identifier UA2 102*b* was instructed (by the "rtcpc-hash-submission-uri" directive) to use when submitting the certificate hash used in UA2 102*b*. UA1's white-list policy update request will now be answered 31 by including the relevant CSP "rtcpc-src" directive with all the hashes, for all the peers' certificate hashes that is currently white-listed in this security context.
33. The script in UA1 102*a* upon having retrieved both the policy update resource as well as having received the RTCPeerConnection configuration information from UA2 102*b* can now apply the configuration information and continue to establish the RTCPeerConnection.
34. ICE 34*a* runs on both sides, and if successful then the DTLS handshake 34*b-c* occurs, exchanging their certificates. Each UA will verify that the certificates hash matches one of the ones listed in the CSP "rtcpc-src" directive's value field. If not, the RTCPeerConnection will be terminated, and may be reported to the origin server depending on if a report CSP directive was given.

As can be noted in this case, having multiple entities results in some checks and processes to ensure that the white listing has occurred prior to attempting to establish the RTCPeerConnection. If that wasn't done, the RTCPeerConnection could be terminated simply due to the failure to timely deliver the white-list information. In the previous example this coordination is done by not sending the configuration information prior to the pre-requisite policies being in place.

As a further optimization, push mechanisms can be used to place the information in the devices prior to the browser logic or JavaScript logic deduces need of the data. Examples are policy updates and certificate hashes.

It is to be noted that the policies as well as the reporting of the certificate fingerprints needs to be transported securely, they need to be both confidentiality and integrity protected, to prevent an attacker from modifying the information or using the submission URIs to inject fingerprints for a man in the middle. For any HTTP protocol header or function, or the transported data objects usage of HTTPS (TLS) will be the simplest choice.

The above solution is flexible in which entity it is that collects the DTLS certificate hashes, as this is configured for each user agent application instance through the URI provided as value to the "rtcpc-hash-submission-uri" directive. However, the CSP framework limits who can provide updated CSP policies to the origin of the context, and thus provide updated values for the "rtcpc-src" directive that enables the RTCPeerConnections with new peers to be established. Thus, if the F&C connect part of the application is to control the approval of which peers are allowed to communicate, then the parts of the application that perform the F&C as well as establish the RTCPeerConnections will have to be loaded in its own user agent sandbox so that the F&C server becomes origin. However, that makes communication between the parts of the applications more restricted. Otherwise, if the web server 101' remains the origin, there will need to be some API between the F&C server 103 or other server gathering the certificate hashes for the various application instances and the web server 101' to provide the necessary information to provide updated CSP "rtcpc-src" directives.

The web server 101', supported by information provided using the F&C to web server API in the second usage, can perform analysis of the communication and its patterns for potentially malicious usage. For example, the malicious scripts could attempt to explicitly use the F&C server 103 to create a chain of RTCPeerConnection so that UA3 will become a man in the middle between UA1 and UA2, by establishing two RTCPeerConnections, one from UA1 to UA3, and another from UA3 to UA2.

Figure 5A:
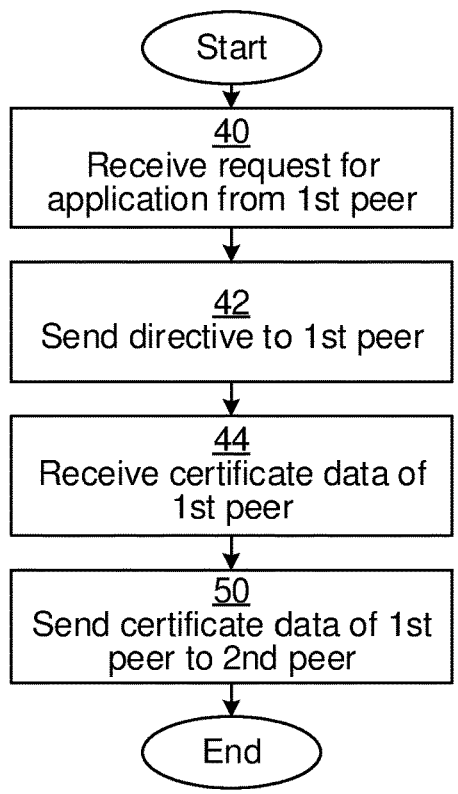
FIGS. 5A-B are schematic flow charts illustrating embodiments of methods in a server for enabling secure setup of a peer-to-peer connection.
Figure 5B:
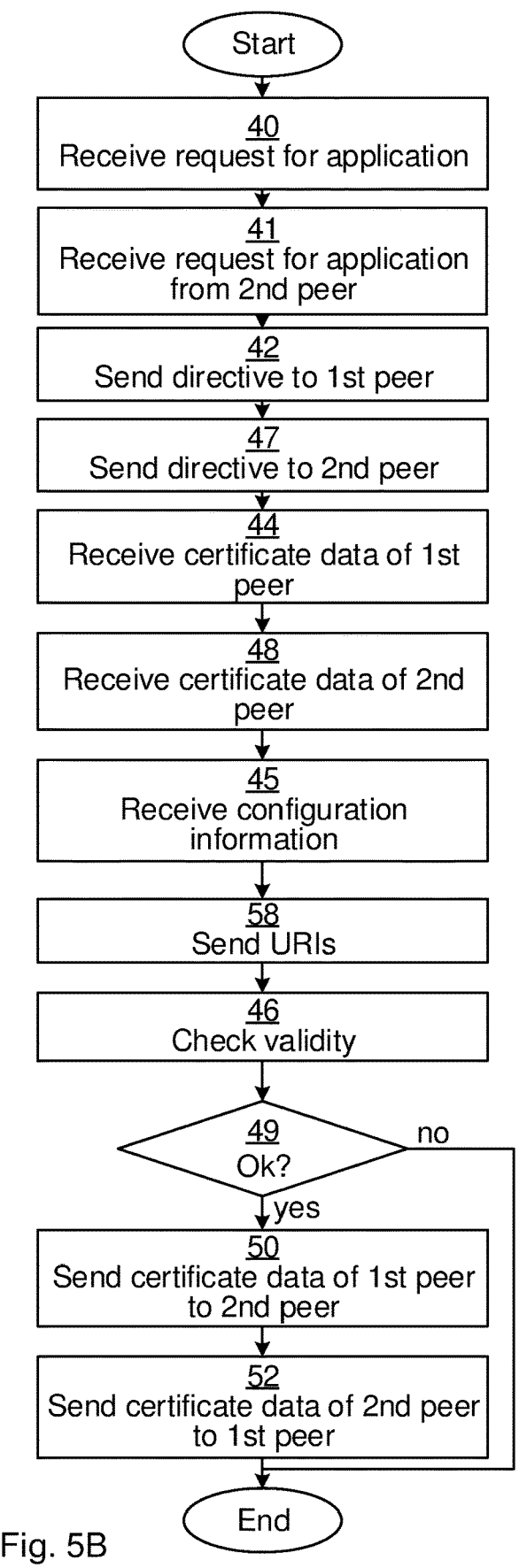

FIGS. 5A-B are schematic flow charts illustrating embodiments of methods in a server for enabling secure setup of a peer-to-peer connection between a first peer and a second peer. The secure peer to peer connection can e.g. be a Datagram Transport Layer Security, DTLS, connection, in which case each certificate is a DTLS certificate. It is to be noted that the steps of the method are not limited to the order shown here; the steps can be performed in any suitable order, as long as any explicitly mentioned dependencies are fulfilled. Embodiments of the methods of FIGS. 5A-B are illustrated and explained with reference to FIGS. 3 and 4 above, from a perspective of the combined server 101 or the web server 101'.

In a receive request for application from $1^{st}$ peer step 40, a request (e.g. 1a of FIG. 3 or 21a of FIG. 4) for a web application is received from the first peer.

In a send directive to $1^{st}$ peer step 42, a directive (e.g. 1b of FIG. 3 or 21b of FIG. 4) is sent to the first peer requesting a fingerprint of a certificate of the first peer. The directive can be part of a response to the request in step 40.

Optionally, the directive instructs the first peer to submit hash values for each certificate used with any peer-to-peer connections associated with the web application, as described above. The directive can be a CSP directive.

In a receive certificate data of $1^{st}$ peer step 44, a first fingerprint (e.g. 4 of FIG. 3 or 23 of FIG. 4) from the first peer is received. The fingerprint be one or more respective hash values, respectively of each certificate in use in the context for the web application. The fingerprint(s) can be received in a CSP directive comprising a respective fingerprint of each certificate in use in the context for the web application.

In a send certificate data of $1^{st}$ peer to $2^{nd}$ peer step 50, the first fingerprint (e.g. 9 of FIG. 3 or 29b of FIG. 4) is sent to the second peer.

Looking now to FIG. 5B, only new or modified steps compared to FIG. 5A will be described.

In a receive request for application from $2^{nd}$ peer step 41, a request (e.g. 1a from UA2 of FIG. 3 or 21a from UA2 of FIG. 4) for the web application is received from the second peer.

In a send directive to $2^{nd}$ peer step 47, a directive (e.g. 1b to UA2 of FIG. 3 or 21b to UA2 of FIG. 4) is sent to the second peer requesting a fingerprint of a certificate of the second peer.

Optionally, the directive instructs the second peer to submit hash values for each certificate used with any peer-to-peer connections associated with the web application. The directive can be a CSP directive.

In a receive certificate data of $2^{nd}$ step 48, a second fingerprint (e.g. 12 of FIG. 3 or 28 of FIG. 4) is received from the second peer. The fingerprint be one or more respective hash values, respectively of each certificate in use in the context for the web application. The fingerprint(s) can be received in a CSP directive comprising a respective fingerprint of each certificate in use in the context for the web application.

In a send certificate data of $2^{nd}$ peer to $1^{st}$ peer step 52, the second fingerprint is sent (e.g. 16 of FIG. 3 or 32 of FIG. 4) to the first peer.

In a receive configuration information step 45, configuration information (e.g. 6 of FIG. 3 or 25a (via the F&C server) of FIG. 4) is received from the first peer, the configuration information including an identifier of the second peer.

In a check validity step 46, a validity of the sender of the configuration message is checked by checking the configuration message against the first fingerprint data.

In a send URIs step 58, two uniform resource identifier, URIs, (e.g. 25b of FIG. 4) are respectively sent for the first peer and the second peer, to receive fingerprint data. The URIs can be sent to the F&C server for provision to the two peers. In such a case, the send certificate data of $1^{st}$ peer to $2^{nd}$ peer step 50 comprises sending the first fingerprint in a response to a request using one of the URIs. Also, the send certificate data of $2^{nd}$ peer to $1^{st}$ peer step 52 then comprises sending the second fingerprint in a response to a request using one of the URIs.

An advantage with the solution according to the embodiments presented herein is that it provides a strong in depth security mechanism that prevents a serious type of attacks that can breach the data media security for the users, this without any increased burden on the users themselves.

It furthermore does so in a way where the web service operator is not dependent on another actor for provisioning the necessary infrastructure, as is the case with DANE where the DNS operator plays a key role.

Figure 6A:
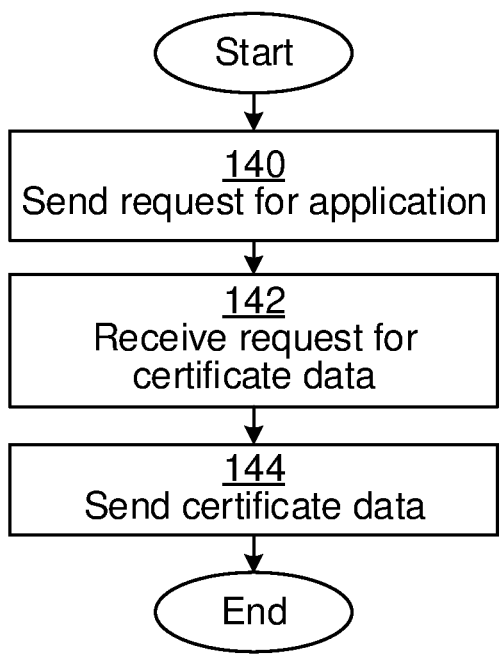
FIGS. 6A-B are schematic flow charts illustrating embodiments of methods in a peer device for enabling secure setup of a peer-to-peer connection.
Figure 6B:
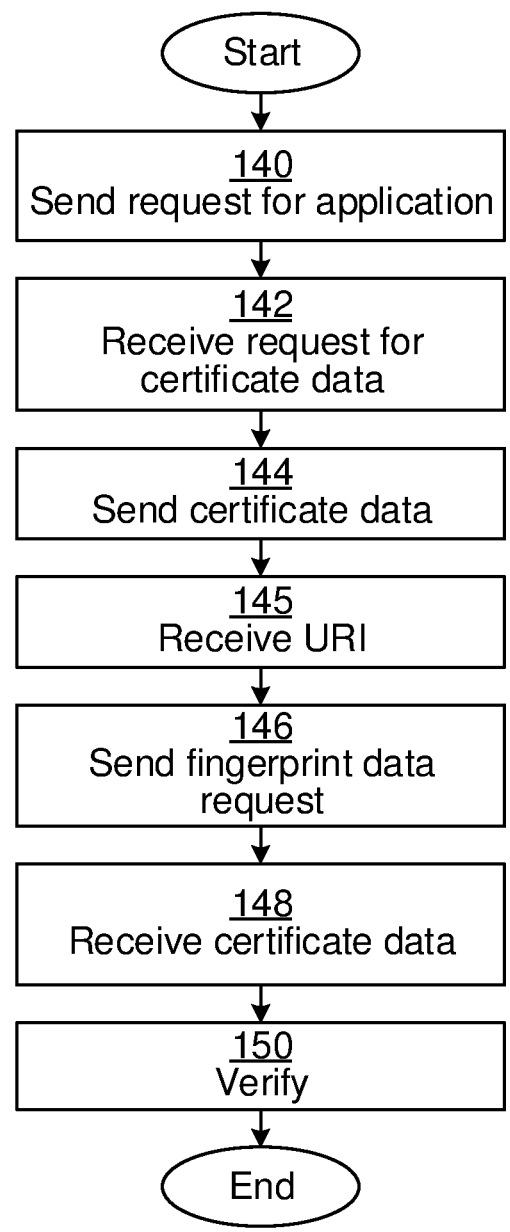

FIGS. 6A-B are schematic flow charts illustrating embodiments of methods in a peer device for enabling secure setup of a peer-to-peer connection between a first peer and a second peer. The secure peer to peer connection can e.g. be a Datagram Transport Layer Security, DTLS, connection, in which case each certificate is a DTLS certificate. It is to be noted that the steps of the method are not limited to the order shown here; the steps can be performed in any suitable order, as long as any explicitly mentioned dependencies are fulfilled. Embodiments of the methods of FIGS. 6A-B are illustrated and explained with reference to FIGS. 3 and 4 above, from a perspective of the first peer 102a.

In a send request for application step 140, a request (e.g. 1a of FIG. 3 or 21a of FIG. 4) for a web application is sent to a server, e.g. 101 of FIG. 1 or 101' of FIG. 2.

In a receive request for certificate data step 142, a directive (e.g. 1b of FIG. 3 or 21b of FIG. 4) for a fingerprint of a certificate of the peer is received. The directive can be a CSP directive for the fingerprint In send certificate data step 144, in response to the request, a first fingerprint (e.g. 4 of FIG. 3 or 23 of FIG. 4) of a certificate of the first peer is sent for verification that the first fingerprint corresponds to a certificate of the first peer. The fingerprint can be sent in a CSP directive. Optionally, this comprises sending the first fingerprint using a URI included in the directive for the fingerprint, as exemplified in FIG. 4 and described above.

Looking now to FIG. 6B, only new of modified steps in comparison to FIG. 6A will be described.

In a receive URI step 145, a URI (e.g. 26*b* of FIG. 4) for receiving fingerprint data is received.

In a send fingerprint data request step 146, a fingerprint data request (e.g. 27 of FIG. 4) is sent using the URI.

In a receive certificate data step 148, a second fingerprint (e.g. 16 of FIG. 3 or 32 of FIG. 4) of a certificate of the second peer is received. Optionally, the second fingerprint is received in a response to the fingerprint data request. The second fingerprint can be received in a CSP directive.

In a verify step 150, an identity of the second peer is verified, in a handshake process with the second peer, by comparing with the second fingerprint, wherein the handshake is only successful when the verification is successful.

Optionally, each fingerprint comprises a hash value of a certificate.

Figure 7:
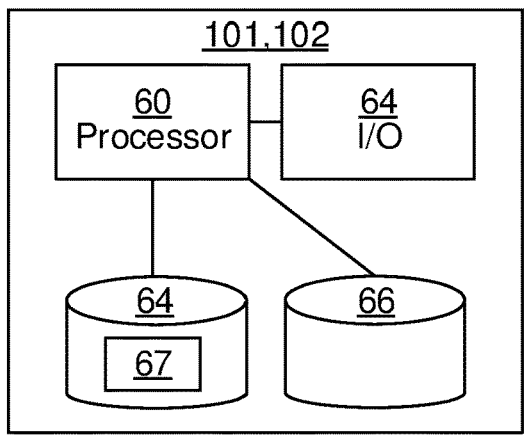
FIG. 7 is a schematic diagram illustrating components of any of the servers or peer devices of FIGS. 1-2, here represented by a single device.

FIG. 7 is a schematic diagram illustrating components of any of the servers or peer devices of FIGS. 1-2, here represented by a single device 101, 102. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIGS. 5A-B and FIGS. 6A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The server 101/peer device 102 further comprises an I/O interface 62 for communicating with other external entities. Optionally, the I/O interface 62 also includes a user interface.

Other components of the server 101/peer device 102 are omitted in order not to obscure the concepts presented herein.

Figure 8:
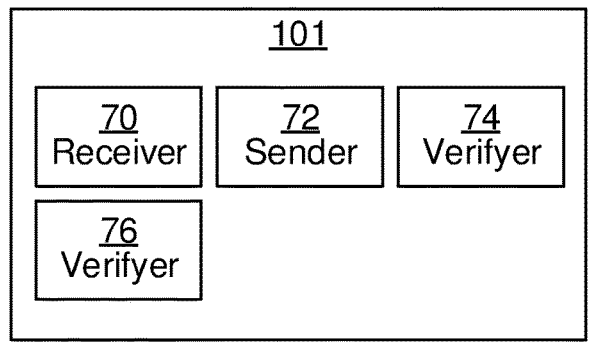
FIG. 8 is a schematic diagram showing functional modules of the combined server of FIG. 1 or the web server of FIG. 2 according to one embodiment.

FIG. 8 is a schematic diagram showing functional modules of the combined server 101 of FIG. 1 or the web server 101' of FIG. 2 according to one embodiment. The modules are implemented using software instructions such as a computer program executing in the server. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A-B.

A receiver 70 corresponds to steps 40, 41, 44, 45 and 48. A sender 72 corresponds to steps 42, 47, 40, 52 and 58. A verifier 74 corresponds to step 46. A determiner 76 corresponds to step 49.

Figure 9:
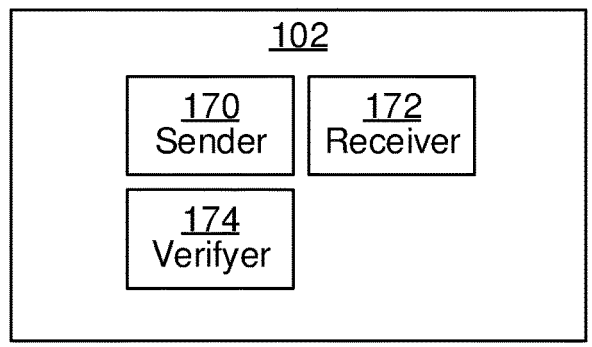
FIG. 9 is a schematic diagram showing functional modules of any of the peer device of FIGS. 1-2 according to one embodiment, here represented by a single peer device.

FIG. 9 is a schematic diagram showing functional modules of any of the peer device 102*a-b* of FIGS. 1-2 according to one embodiment, here represented by a single peer device 102. The modules are implemented using software instructions such as a computer program executing in the peer device. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A-B.

A sender 170 corresponds to steps 140, 144 and 146. A receiver 172 corresponds to steps 142, 145 and 148. A verifier 174 corresponds to step 150.

Figure 10:
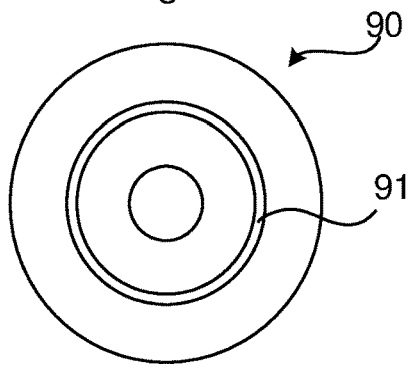
FIG. 10 shows one example of a computer program product comprising computer readable means.

FIG. 10 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows another perspective of embodiments, presented using various aspects.

According to one aspect a method for a server for setting up a peer-to-peer connection is provided. In the method the server receives a request for an application from a UA (user agent). The server then sends a request for a certificate of the UA, and in response to that request the server receives the certificate of the UA. The server verifies that the certificate is an allowed certificate and also verifies certificates for the peer in the peer-to-peer connection. If all certificates for the involved peers are allowed, then the server initiates establishment of the peer-to-peer connection.

According to one aspect a server for setting up a peer-to-peer connection is provided. The server is configured to receive a request for an application from a UA (user agent). The server is configured to then send a request for a certificate of the UA, and the server is configured to receive the certificate of the UA. The server is configured to verify that the certificate is an allowed certificate and is also configured to verify certificates for the peer in the peer-to-peer connection. If all certificates for the involved peers are allowed, then the server is configured to initiate establishment of the peer-to-peer connection.

According to one aspect a server for setting up a peer-to-peer connection is provided. The server comprises a receiver for receiving a request for an application from a UA (user agent). The server further comprises a sender for sending a request for a certificate of the UA, and the receiver is further configured to receive the certificate of the UA. The server also comprises a verifier for verifying that the certificate is an allowed certificate and for verifying certificates for the peer in the peer-to-peer connection. If all certificates for the involved peers are allowed, an establisher of the server is configured to initiate establishment of the peer-to-peer connection.

According to one aspect a method for a UA for setting up a peer-to-peer connection between said UA and another peer is provided. In the method the UA sends a request for an application to a server. The UA then receives a request for a certificate of the UA, and in response to that request the UA sends the certificate of the UA such that the server can verify that the certificate is an allowed certificate and such that the server also can verify certificates for the peers in the peer-to-peer connection. If all certificates for the involved peers are allowed, then the server initiates establishment of the peer-to-peer connection.

According to one aspect a UA for setting up a peer-to-peer connection between said UA and another peer is provided. The UA is configured to send a request for an application to a server. The UA is then configured to receive a request for a certificate of the UA, and in response to that request the UA is configured to send the certificate of the UA such that the server can verify that the certificate is an allowed certificate and such that the server also can verify certificates for the peers in the peer-to-peer connection. If all certificates for the involved peers are allowed, then the server initiates establishment of the peer-to-peer connection.

According to one aspect a UA for setting up a peer-to-peer connection between said UA and another peer is provided. The UA comprises a sender for sending a request for an application to a server. The UA further comprises a receiver to receive a request for a certificate of the UA, and in response to that request the sender is further configured to send the certificate of the UA such that the server can verify that the certificate is an allowed certificate and such that the server also can verify certificates for the peers in the peer-to-peer connection. If all certificates for the involved peers are allowed, then the server initiates establishment of the peer-to-peer connection.

The server may be a web server and the embodiments may be applied in the context real time web browsing.

The server may be a combined web server and F&C server or the function of server may be distributed over more than one server, e.g. one web server and one F&C server.

According to a further aspect, the UA comprises a processor and a memory comprising instructions executable by the processor. The processor is operative to perform the method of the UA as described above According to a further aspect, the server comprises a processor and a memory comprising instructions executable by the processor. The processor is operative to perform the method of the server as described above The input units (receivers) could be in the form of a general input unit, in particular in the case of a wired connection to external devices. Alternatively, the input unit could be in the form of a receiver or transceiver, in particular in the case or a wireless connection to external devices. Correspondingly, the output units (senders) could be in the form of a general output unit, in particular in the case of a wired connection to external devices. Alternatively, the output unit could be in the form of a transmitter or transceiver, in particular in the case or a wireless connection to external devices.

Alternatively, at least some of the steps, functions, procedures, modules and/or blocks/units described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular embodiment, the processor is operative, when executing the instructions stored in the memory to perform the above described operations. The processor is thereby interconnected to the memory to enable normal software execution.

In one example, at least some of the steps, functions, procedures, modules and/or blocks described herein are implemented in a computer program, which is loaded into the memory for execution by processing circuitry including one or more processors. The processor and memory are interconnected to each other to enable normal software execution. A communication circuitry is also interconnected to the processor and/or the memory to enable input and/or output of video data.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a carrier comprising the computer program. The carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, preferably non-volatile computer-readable storage medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device, represented by the arrangement for execution by the processor thereof.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for a server for enabling setting up a secure peer-to-peer connection between a first peer and a second peer, wherein at least one of the first peer and the second peer is a web browser, the method comprising:
responsive to receiving a first request for a web application from the first peer, sending a first Content Security Policy (CSP) directive to the first peer requesting a fingerprint of a certificate of the first peer;
responsive to receiving a second request for the web application from the second peer, sending a second CSP directive to the second peer requesting a fingerprint of a certificate of the second peer;

receiving a further CSP directive from each of the first and second peers, each of the further CSP directives comprising a respective fingerprint of each certificate in use in context of the web application;

sending a first fingerprint of the first peer to the second peer; and sending a second fingerprint of the second peer to the first peer.

2. The method of claim 1, wherein:

the first CSP directive and the second CSP directive respectively instruct the first peer and the second peer to submit hash values for certificates used with any peer-to-peer connections associated with the web application; and each of the further CSP directives further comprises a respective hash value of each certificate in use in the context for the web application.

3. The method of claim 1, further comprising receiving configuration information from the first peer, the configuration information including an identifier of the second peer.

4. The method of claim 3, further comprising:

comparing the configuration information against the first fingerprint; and determining whether the sender is valid based on the comparison.

5. The method of claim 1:

further comprising sending respective uniform resource identifiers (URIs) to the first peer and the second peer for use in receiving fingerprint data;

wherein the sending the first fingerprint to the second peer comprises sending the first fingerprint in a response to a request using one of the URIs; and wherein the sending the second fingerprint to the first peer comprises sending the second fingerprint in a response to a request using the other of the URIs.

6. The method of claim 1, wherein the secure peer-to-peer connection is a Datagram Transport Layer Security (DTLS) connection and each certificate is a DTLS certificate.

7. A server for enabling setting up a secure peer-to-peer connection between a first peer and a second peer, wherein at least one of the first peer and the second peer is a web browser, the server comprising:

processing circuitry; and memory containing instructions executable by the processing circuitry whereby the server is operative to:

responsive to receiving a first request for a web application from the first peer, send a first Content Security Policy (CSP) directive to the first peer requesting a fingerprint of a certificate of the first peer;

responsive to receiving a second request for the web application from the second peer, send a second CSP directive to the second peer requesting a fingerprint of a certificate of the second peer;

receive a further CSP directive from each of the first and second peers, each of the further CSP directives comprising a respective fingerprint of each certificate in use in context of the web application;

send a first fingerprint of the first peer to the second peer; and send a second fingerprint of the second peer to the first peer.

8. The server of claim 7, wherein:

the first CSP directive and the second CSP directive respectively instruct the first peer and the second peer to submit hash values for certificates used with any peer-to-peer connections associated with the web application; and each of the further CSP directives further comprises a respective hash value of each certificate in use in the context for the web application.

9. The server of claim 7, wherein the instructions are such that the server is further operative to receive configuration information from the first peer, the configuration information including an identifier of the second peer.

10. The server of claim 9, wherein the instructions are such that the server is further operative to:

compare the configuration information against the first fingerprint; and determine whether the sender is valid based on the comparison.

11. The server of claim 7, wherein the instructions are such that the server is further operative to:

send respective uniform resource identifiers (URIs) to the first peer and the second peer for use in receiving fingerprint data; and send the first fingerprint to the second peer in a response to a request using one of the URIs; and send the second fingerprint to the first peer in a response to a request using the other of the URIs.

12. The server of claim 7, wherein the secure peer-to-peer connection is a Datagram Transport Layer Security (DTLS) connection and each certificate is a DTLS certificate.

13. A non-transitory computer readable recording medium storing a computer program product for enabling setting up a secure peer-to-peer connection between a first peer and a second peer, wherein at least one of the first peer and the second peer is a web browser, the computer program product comprising software instructions which, when run on processing circuitry of a server, causes the server to:

responsive to receiving a first request for a web application from the first peer, send a first Content Security Policy (CSP) directive to the first peer requesting a fingerprint of a certificate of the first peer;

responsive to receiving a second request for the web application from the second peer, send a second CSP directive to the second peer requesting a fingerprint of a certificate of the second peer;

receive a further CSP directive from each of the first and second peers, each of the further CSP directives comprising a respective fingerprint of each certificate in use in context of the web application;

send a first fingerprint of the first peer to the second peer; and send a second fingerprint of the second peer to the first peer.

14. A peer device, being a first peer, for enabling setting up a secure peer-to-peer connection between the first peer and a second peer, wherein at least one of the first peer and the second peer is a web browser, the peer device comprising:

processing circuitry; and memory containing instructions executable by the processing circuitry whereby the peer device is operative to:

responsive to sending a request for a web application to a server, receive a Content Security Policy (CSP) directive requesting a fingerprint of a certificate of the first peer; and send, in response to the request, a further CSP directive comprising a respective fingerprint of each certificate in use in context of the web application for verification that at least a first fingerprint of the respective fingerprints corresponds to a certificate of the first peer.

15. The peer device of claim 14, wherein the instructions are such that the peer device is further operative to:
receive a uniform resource identifier (URI) for receiving fingerprint data;
send a fingerprint data request using the URI; and
receive a response to the fingerprint data request, the response comprising a second fingerprint of a certificate of the second peer.

16. The peer device of claim 15, wherein:
the URI is comprised in the CSP directive; and
the instructions are such that the peer device is further operative to send the first fingerprint using the URI.

* * * * *